Patented July 4, 1950

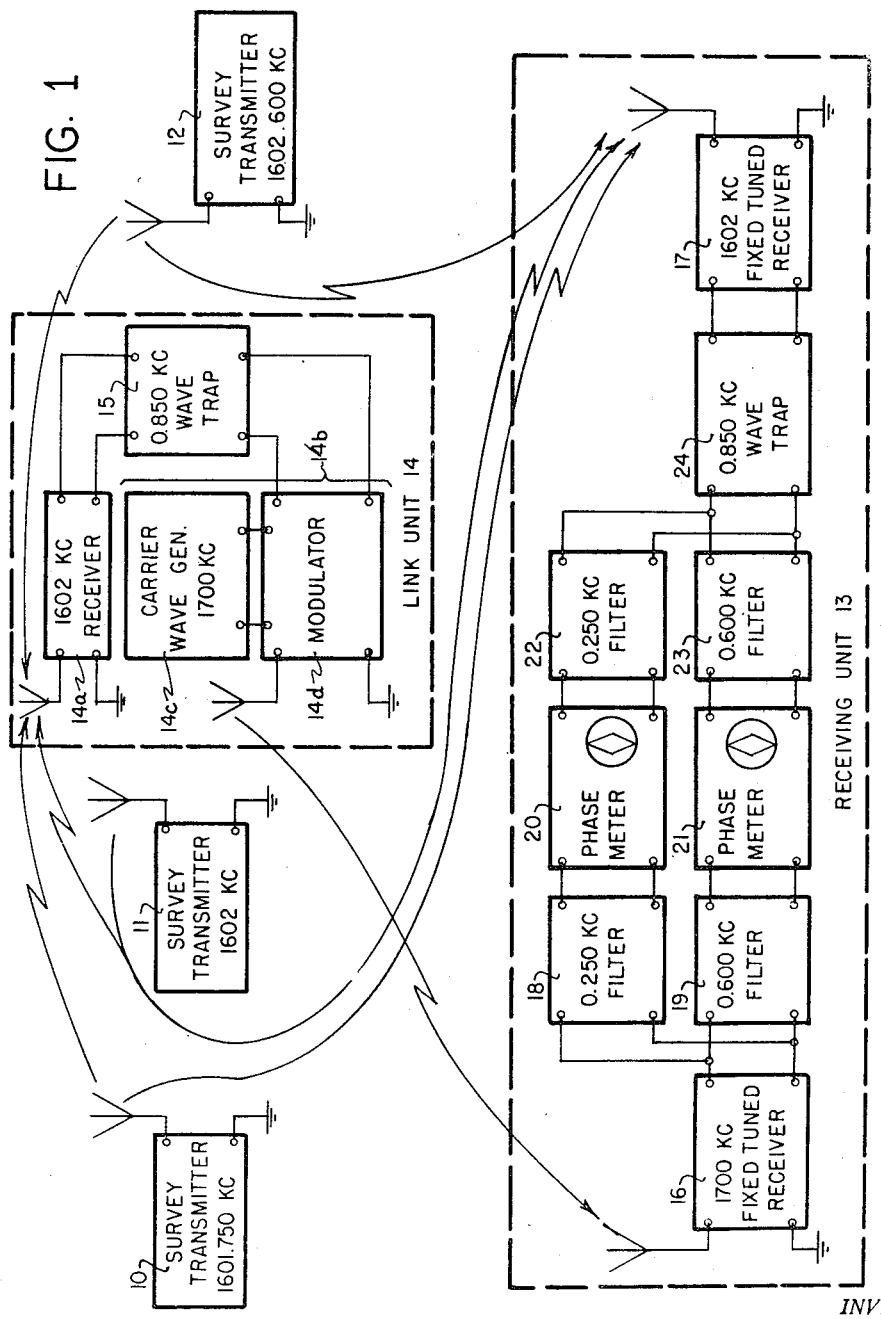

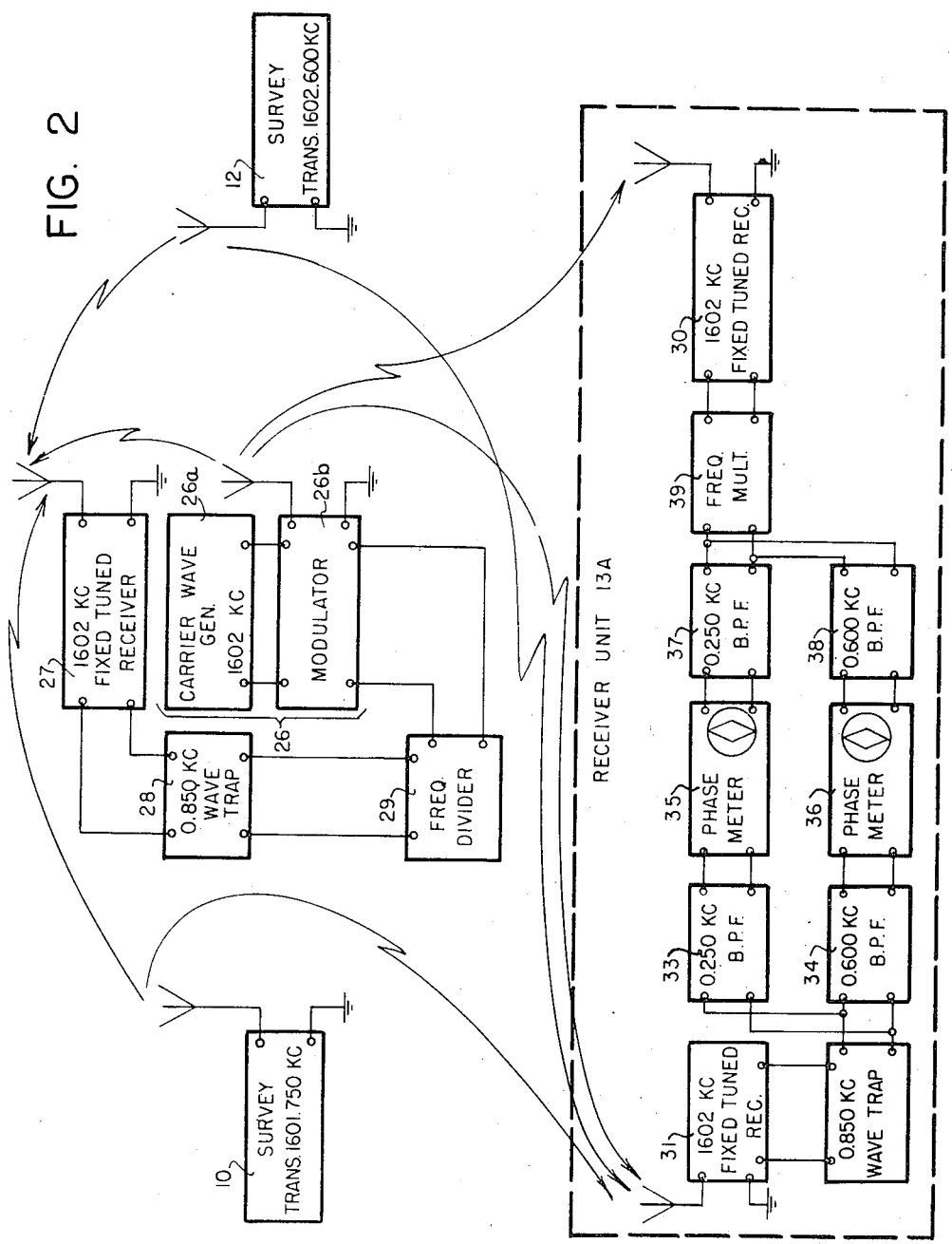

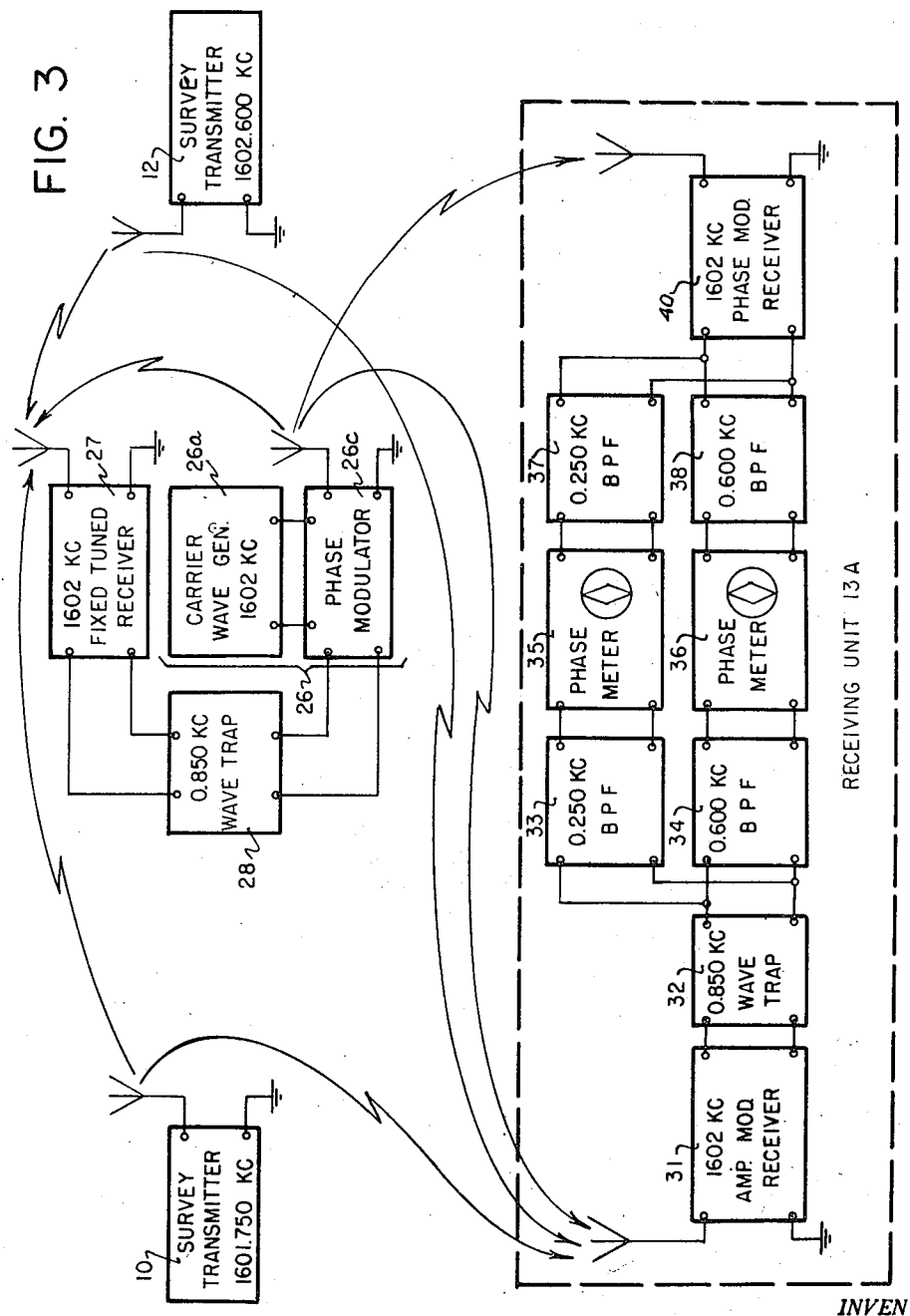

2,513,316

UNITED STATES PATENT OFFICE 2,513,316

RADIO SURVEY SYSTEM

James E. Hawkins, Tulsa, Okla., assignor to Seismograph Service Corporation, Tulsa, Okla., a corporation of Delaware Application October 9, 1947, Serial No. 778,795

26 Claims. (Cl. 343—105)

The present invention relates to radio position finding systems and more particularly to improvements in radio position finding systems of the hyperbolic, continuous wave type employing phase comparison in pairs of position indication signals radiated from at least three spaced transmitting points to provide indications from which the position of a mobile receiving point relative to the known positions of the transmitting points may be determined.

In systems of the particular type referred to, the continuous waves radiated from each pair of transmitters produce standing waves in space, the phase relationship of which changes as a function of changing position between the two transmitting points. More specifically, the standing waves produced by each pair of transmitting units of the system are characterized by equi-phase lines which are hyperbolic in contour about the transmitting points as foci. On a line bisecting the pair of transmitters, these equi-phase lines are spaced apart a distance equal to one-half the mean wave length of the radiated waves and have diverging spacings at points on either side of this line. With this system arrangement, the position of a receiving point relative to a pair of hyperbolic equi-phase lines may be determined by measuring the phase relationship between continuous waves radiated from the pair of transmitters. Since the point of location of the receiving point along the zone separating the two equi-phase lines is not indicated by such a phase measurement, it becomes necessary to employ at least three spaced transmitters, different pairs of which function to provide a grid-like pattern of intersecting hyperbolic lines, in order to obtain absolute determination of the position of the receiving point. Systems of the character described are exceedingly accurate insofar as the position indications produced at the receiving point are concerned. To obtain the desired indication accuracy, however, it is necessary to maintain phase synchronization between the continuous waves radiated by the spaced transmitters, or alternatively, so to arrange the system that phase shifts between the radiated waves are compensated during the phase comparing operation. Phase synchronization of the waves radiated from the plurality of transmitters presents an exceedingly difficult problem which has been the subject of considerable development work. All solutions which have been found for this problem involve the use of relatively elaborate and somewhat delicate instrumentation not well adapted for the continuity of service required in position determining systems. To obviate this problem, systems of the continuous wave hyperbolic type have been proposed (see Honore Patent No. 2,148,267) in which the phase shift problem is obviated by heterodyning the carrier waves of each pair of transmitters at a fixed link transmitting point, and modulating the difference frequency component of the heterodyned waves as a reference signal upon the carrier output of the link transmitter for radiation to the receiving point, where the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point between a pair of equi-phase lines. While the described arrangement for obviating the phase problem completely solves this problem, it entails the use of two carrier channels in addition to the three or four channels taken up by the three or four continuously operating survey transmitters, in order to make up a complete system. It is also desirable that the channel frequencies be located adjacent the broadcast band or at least below the ultra-high frequency band in order to obviate the problem of line-of-sight transmission. This, of course, means location of a number of channel frequencies in the most crowded portion of the frequency spectrum, at least insofar as operations in the United States are concerned.

It is an object of the present invention, therefore, to provide an improved radio position determining system of the character described which is free of wave synchronization difficulties of the character mentioned and in which the number of frequency channels required for operation of a complete three transmitting unit system is reduced to a minimum.

According to a further object of the invention, the number of frequency channels required is minimized by so arranging the system that not more than one link transmitter is required to radiate the required reference signals to the receiving points.

It is a still further object of the invention to provide an improved radio position determining system of the character described which is entirely free of signal separation problems resulting from heterodyning of the waves to produce sum and difference frequencies.

It is still another object of the invention to provide a radio position determining system of the character described which is so arranged that not more than two (and by appropriate selection of the frequencies, one) 10 kilocycle band of the frequency spectrum embraces all of the carrier and side band frequencies required for operation of a complete three transmitting unit system.

It is a further object of the invention to provide an improved wave signal transmission system uniquely adapted for use in a position determining system of the character described.

It is a still further object of the invention to provide improved and exceedingly simple wave signal receiving and translating apparatus uniquely adapted for use in a position determining system of the character indicated.

The invention, both as to its organization and method of operation, together with further objects and advantages thereof, will best be understood by reference to the specification taken in connection with the accompanying drawings, in which:

Fig. 1 diagrammatically illustrates an improved radio position determining system characterized by the features of the present invention;

Fig. 2 illustrates a modification of the system shown in Fig. 1; and

Fig. 3 illustrates a second modification of the system shown in Fig. 1.

Referring now to the drawings and more particularly to Fig. 1 thereof, the present invention is there illustrated in its embodiment in a system for providing position information at a mobile receiving unit 13 which may be carried by a vessel or vehicle operating within the radius of transmission of three spaced survey transmitters 10, 11, and 12. These transmitters are preferably spaced apart approximately equal distances and are so positioned that the line bisecting the points of location of the transmitters 10 and 11 is angularly related to the line bisecting the points of location of the transmitters 11 and 12. As described more fully below, the three transmitters 10, 11 and 12 are equipped continuously to radiate position indicating signals in the form of carrier waves of different frequencies. To this end, each transmitter may comprise a carrier wave generator or oscillator operating at a carrier frequency different from that of each of the other two generators. Preferably, the carrier waves of the three transmitters are so selected that the frequencies thereof are well within a single channel allocation of 10 kilocycles as specified by the Federal Communications Commission of the United States Government. To this end, the output frequency of the transmitter 10 and the output frequency of the transmitter 11, forming the first transmitter pair, may be 1601.750 and 1602.000 kilocycles, respectively, such that the difference frequency therebetween is 0.250 kilocycle, while the output frequencies of the transmitter 11 and the transmitter 12, forming the second transmitter pair, may be 1602.000 and 1602.600 kilocycles, respectively, such that the difference frequency therebetween is 0.600 kilocycle. It will be noted that the difference frequency between the carrier wave frequencies of the two transmitters 10 and 12 is 0.850 kilocycle. The power of the three survey transmitters is such that the entire area in which position information may be desired aboard the vehicle or vessel carrying the receiving unit 13 is blanketed with waves radiated from each of the three transmitters and that these waves have a field strength at all points within this area sufficient to permit reliable reception without requiring undue sensitivity of the receiving equipment.

In order to obviate the above-mentioned difficulties attendant with phase synchronization of the position indication carrier waves radiated by the three transmitters, while at the same time eliminating the necessity for utilizing more than one additional frequency channel, a link unit 14 is provided for radiating a carrier wave of distinguishable frequency modulated with reference signals representative of the difference frequencies between the carrier wave pairs. These reference signals may be received at any receiving point, such, for example, as at the mobile receiving unit 13, located within the radius of transmission of the three survey transmitters. The link unit 14 provided for this purpose, may be located at any fixed point within the radius of transmission of the three survey transmitters and comprises a fixed tuned amplitude modulation receiver 14a, a link transmitter 14b consisting of a carrier wave generator 14c designed to operate at 1700 kilocycles and a modulator and power amplifier stage 14d, and a 0.850 kilocycle wave trap or band rejection filter 15 for transmitting two of the three reference signals reproduced by the receiver 14a to the modulator and power amplifier stage 14d for modulation upon the carrier output of the generator 14c. More specifically, the receiver 14a is center tuned to a frequency of 1602 kilocycles and is sharply selective to the 1601.750, 1602.000 and 1602.600 kilocycle carrier waves respectively radiated by the transmitters 10, 11 and 12. The beat frequency signals of 0.250, 0.600 and 0.850 kilocycle between the three carriers accepted by the radio frequency section of the receiver 14a are reproduced in the audio frequency section of this receiver and the two first-mentioned signals are delivered to the modulator 14d for amplitude modulation upon the carrier output of the transmitter 14b through the wave trap or narrow band pass rejection filter 15. This filter is sharply tuned to reject the 0.850 kilocycle signal developed by heterodyning the carriers radiated by the transmitters 10 and 12 in the radio frequency section of the receiver 14a.

Referring now particularly to the equipment making up the mobile receiving unit 13, it is pointed out that this equipment comprises a fixed tuned amplitude modulation receiver 16, a second fixed tuned amplitude modulation receiver 17, a pair of phase angle meters 20 and 21, a 0.850 kilocycle wave trap or band rejection filter 24, and two pairs of narrow band pass filters, 19, 23 and 18, 22, center tuned respectively to frequencies of 0.600 and 0.250 kilocycle. More specifically, the receiver 16 is fixed tuned to a carrier acceptance frequency of 1700 kilocycles and is designed to accept the carrier wave and side bands radiated by the link transmitter 14b. The receiver 17, on the other hand, is fixed tuned to a carrier frequency of 1602 kilocycles and is designed to accept the carrier waves radiated by the survey transmitters 10, 11 and 12. The filters 18 and 19, which may be of any standard commercial construction, perform the function of separating the 0.250 and 0.600 kilocycle reference signals reproduced at the output terminals of the receiver 16, and of delivering these signals to the phase meters 20 and 21, respectively. The wave trap 24 is provided to reject the 0.850 kilocycle heterodyne or difference frequency signal reproduced at the output side of the receiver 17 as a result of heterodyning of the carriers radiated by the transmitters 10 and 12. The filters 22 and 23, which may also be of any standard commercial construction, perform the function of separating the 0.250 and 0.600 kilocycle heterodyne or difference frequency signals developed at the output terminals of the wave trap 24, and delivering these signals to the phase meters 20 and 21, respectively. Preferably these meters are of the general character disclosed in Patent No. 1,762,725—Marrison, granted June 10, 1930, and are capable of measuring phase angles in excess of 360 electrical degrees between two impressed signal voltages. Each phase meter is equipped with a rotatable rotor carrying a pointer which indexes with a circular scale to indicate the phase relationship between the two impressed voltages. If desired, each meter may also be equipped with a revolution counter, not shown, gear driven from the rotor element of the meter to provide an indication of the number of equiphase lines traversed by the mobile receiving unit 13 during movement of the craft carrying this unit.

In considering the operation of the above-described position determining system, it will be understood that with the three survey transmitters 10, 11 and 12, and the link unit 14 in continuous operation, unmodulated position indicating carrier waves of 1601.750, 1602.000 and 1602.600 kilocycles are respectively radiated by the three survey transmitters. These carrier waves are picked up and heterodyned in the radio frequency sections of the receivers 14a, and 17. In the receiver 14a, the difference frequency signals of 0.250 and 0.600 kilocycle between the two pairs of carrier waves respectively radiated by the transmitters 10, 11 and 11, 12 are reproduced in the audio frequency section of the receiver. The difference frequency signal of 0.850 kilocycle between the carrier waves radiated by the transmitters 10 and 12 is also reproduced at the output side of the receiver 14a. These signals of the same frequency are rejected by the wave trap 15, with the result that they are not modulated upon the carrier wave output of the transmitter 14b. The 0.250 and 0.600 heterodyne signals, on the other hand, are passed by the wave trap 15 and amplitude modulated upon the carrier wave output of the link transmitter 14b for radiation as reference signals. This modulated carrier wave is received by the receiver 16 of the mobile receiving unit 13 and the 0.250 and 0.600 kilocycle modulation components are reproduced at the output terminals of the receiver. The 0.250 kilocycle reference signal thus reproduced by the receiver 16 is rejected by the filter 19 and passed by the filter 18 for application to the left set of input terminals of the phase meter 20. Similarly, the 0.600 kilocycle reference signal reproduced by the receiver 16 is rejected by the filter 18 and passed by the filter 19 for application to the left set of input terminals of the phase meter 21.

Heterodyning of the carrier waves radiated by the three transmitters 10, 11 and 12 in the radio frequency section of the receiver 17 results in the reproduction of the heterodyne or difference frequency signals of 0.250, 0.600 and 0.850 kilocycle at the output side of this receiver. The 0.850 kilocycle signals are rejected by the wave trap 24, whereas the 0.250 and 0.600 kilocycle difference frequency signals are passed by this trap and applied to the input terminals of the two filters 22 and 23. The 0.250 kilocycle signal is rejected by the filter 23 and passed by the filter 22 to be applied to the right set of input terminals of the phase meter 20. Similarly, the 0.600 kilocycle signal is rejected by the filter 22 and passed by the filter 23 for application to the right set of input terminals of the phase meter 21. Thus two signal voltages of identical frequency (0.250 kilocycle) are applied to the two sets of input terminals of the phase meter 20, with the result that this phase meter functions to measure the phase angle therebetween. Concurrently, two signal voltages of identical frequency (0.600 kilocycle) are applied to the two sets of input terminals of the phase meter 21, with the result that this phase meter functions to measure the phase angle therebetween.

As will be evident from the above explanation, the phase meter 20 functions to produce a phase angle indication which is representative of the position of the receiving unit 13 between two equi-phase lines of the standing waves produced in space as a result of carrier wave radiation by the transmitters 10 and 11. With the described arrangement, wherein carrier wave frequencies of 1601.750 and 1602.000 kilocycles are employed, the wave length spacing between the equi-phase lines along a line bisecting the transmitters 10 and 11 is determined by the mean frequency of 1601.875 kilocycles between the two radiated carrier waves. At this particular mean frequency, equi-phase lines representative of the same phase relationship between the standing waves produced by the transmitters 10 and 11 along the line bisecting these transmitters are spaced apart a distance of about 307 feet. Hence the indication provided by the phase meter 20 identifies the position of the receiving unit 13 within a zone not less than 307 feet in width, i. e., a zone having a minimum width equal to one half the wave length of a wave having a frequency equal to the mean frequency of the position indicating carrier waves radiated by the transmitters 10 and 11.

As previously indicated, the indication provided by the phase meter 20, standing alone, is ambiguous for the reason that this indication does not identify the point of location of the receiving unit 13 along the zone separating the two adjacent equi-phase lines of the standing waves produced in space by the transmitters 10 and 11. Identification of this point is obtained through the response of the receiving unit to the position indicating signals radiated by the transmitters, 11 and 12. Thus, the phase meter 21 provides an indication of the position of the receiving point, namely, the unit 13, between two equi-phase lines of the standing waves produced in space by the radiation of position indicating carrier waves from the transmitters 11 and 12. Here again, the wave length spacing of equi-phase lines along a line bisecting the two units 10 and 11 is determined by the mean frequency of 1602.300 kilocycles between the frequencies of the waves radiated by the transmitters 11 and 12. At this particular mean frequency, equi-phase lines representative of the same phase relationship between the standing waves produced by the two identified transmitters also have a minimum spacing of approximately 307 feet, such that the indication provided by the meter 21 identifies the position of the receiving unit 13 within a zone having a 307 foot minimum width. The two indications thus provided by the phase meters 20 and 21 may readily be resolved into distance indications from which the position of the receiving point relative to the two transmitters 10 and 12 may be determined. With these distances known and the positions of the transmitters 10 and 12 known, the position of the receiving point may obviously be easily determined.

Referring now more particularly to Fig. 2 of the drawings, the modified system there illustrated includes facilities for eliminating the link unit 14 and for employing a combined position indicating signal and reference signal transmitter 26 intermediate the two end transmitters 10 and 12. This modification has the advantage of eliminating one transmitter from the transmission system and the attendant advantage of reducing from two to one the number of 10 kilocycle channels required for operation of a complete three transmitter system. More in detail, the equipment provided at the centrally located transmission point comprises a transmitter 26 consisting of a 1602 kilocycle carrier wave generator 26a and a combined modulator and power amplifier stage 26b, a fixed tuned amplitude modulation receiver 27, a 0.850 kilocycle wave trap 28 and a frequency divider 29. The receiver 27 is tuned to a center frequency of 1602 kilocycles and is designed to accept the carrier waves respectively radiated by the transmitters 10, 26 and 12. It functions as a heterodyne receiver to develop heterodyne or difference frequency signals across its output terminals representative of the difference frequency signals between three received carrier waves. As pointed out more fully below, two of these three difference frequency signals are passed by the wave trap 28, frequency divided by the frequency divider 29 and impressed upon the modulator terminals of the modulator 26b for modulation upon the carrier wave output of the generator 26a. Preferably, the frequency divider 29 is designed to have a ten to one ratio between the frequency or frequencies at which it is excited and the frequency or frequencies developed at the output terminals thereof. The purpose of providing this frequency divider is to permit separation of the reference signals from the heterodyned or difference frequency signals developed in the reference signal receiver of any mobile receiving unit such, for example, as the unit 13A, at which the waves radiated by the three transmitters are received. It will be noted that the three transmitters 10, 26 and 12 of the described transmission system respectively operate at carrier frequencies of 1601.750, 1602 and 1602.600 kilocycles. These frequencies are all embraced within a band having a width of less then 10 kilocycles, i. e., a band falling well within a single channel allocation of the Federal Communications Commission.

In general, the receiving unit 13A of the Fig. 2 system is similar to the receiving unit 13 of the Fig. 1 system. Thus the receiving unit 13A comprises a fixed tuned amplitude modulation reference signal receiver 30 and a fixed tuned amplitude modulation heterodyne receiver 31. These two receivers are both tuned to the same signal carrier acceptance frequency of 1602 kilocycles. The signals developed across the output terminals of the receiver 30 are frequency multiplied by means of a frequency multiplier 39 having a multiplication factor equaling the division factor of the frequency divider 29, and are selectively passed by two narrow band pass filters 37 and 38 for application to the respective right sets of terminals of the phase meters 35 and 36. The heterodyne or difference frequency signals developed across the output terminals of the heterodyne receiver 31 are partially passed by a 0.850 kilocycle wave trap or band rejection filter 32 and are further passed on a selective basis by two narrow band pass filters 33 and 34 to the respective left sets of input terminals of the two phase meters 35 and 36. The two filters 33 and 37 are respectively tuned to the same center frequency of 0.250 kilocycles, whereas the two other filters 34 and 38 are respectively tuned to the same center frequency of 0.600 kilocycles.

Aside from the manner in which the reference signals are impressed upon the carrier wave output of the transmitter 26 for radiation to receiving units within the radius of transmission of the three transmitters 10, 26 and 12, and the manner in which the heterodyne and reference signals are selectively received and separated in the receiving unit 13A, the system shown in Fig. 2 and just described operates in the exact manner explained above with reference to the system shown in Fig. 1 of the drawings. In brief, the carrier waves radiated by the three transmitters 10, 26 and 12 are accepted by and heterodyned in the radio frequency sections of each of the three receivers 27, 30 and 31. As a result, difference frequency signals having frequencies of 0.250, 0.600 and 0.850 kilocycle are reproduced across the output terminals of each of the three identified receivers. At the respective output sides of the two receivers 27 and 31, the two signals having a frequency of 0.850 kilocycle are rejected by the wave traps 28 and 32 respectively. The 0.250 and 0.600 kilocycle signals, on the other hand, are passed by these traps. The signals thus developed across the output terminals of the wave trap 28 are frequency divided by a factor of ten to produce signals having frequencies of 25 and 60 cycles across the output terminals of the frequency divider 29, which are modulated upon the carrier wave output of the generator 26a for space radiation. The 0.250 and 0.600 kilocycle heterodyne signals developed across the output terminals of the wave trap 32 are selectively passed respectively by the filters 33 and 34 and are applied to the respective left sets of input terminals of the phase meters 35 and 36.

The reference signal receiver 30 functions to detect and reproduce the 25 and 60 cycle reference signals, along with the heterodyne or difference frequency signals resulting from heterodyning of the carrier waves in the radio frequency section of this receiver. Accordingly, signals having frequencies of 25, 60, 250, 600, and 850 cycles are developed across the output terminals of this receiver. These signals are all frequency multiplied by a factor of ten through operation of the frequency multiplier 39, such that signals having frequencies of 0.250, 0.600, 2.500, 6.000, and 8.500 kilocycles are developed across the output terminals of this frequency multiplier. All of these signals with the exception of the frequency multiplied reference signals having frequencies of 0.250 and 0.600 kilocycle are rejected by the two filters 37 and 38. The 0.250 kilocycle reference signal is also rejected by the filter 38, but is passed by the filter 37 for application to the right set of input terminals of the phase angle meter 35. Similarly, the 0.600 kilocycle reference signal is rejected by the filter 37 and passed by the filter 38 for application to the right set of input terminals of the phase meter 36. Thus two signal voltages having identical frequencies of 0.250 kilocycle are respectively impressed across the two sets of input terminals of the meter 35. This meter in measuring the phase relationship between the two applied signal voltages provides an indication accurately representative of the position of the receiving unit 13A relative to two equi-phase lines of the standing waves formed in space by the carrier waves radiated from the transmitters 10 and 26. In similar manner, two signal voltages having identical frequencies of 0.600 kilocycle are respectively applied to the two sets of input terminals of the phase angle meter 36. This meter in measuring the phase relationship between the applied signal voltages, provides an indication accurately representative of the position of the receiving unit 13A relative to two equi-phase lines of the standing waves formed in space by the carrier waves radiated from the transmitters 26 and 12. Thus two indications are provided by the phase meters 35 and 36 from which the position of the receiving unit 13A relative to the two transmitters 10 and 12 may readily be determined.

In the above explanation with reference to Fig. 2 of the drawings, the modulator of the unit 26b is described as being of the amplitude modulation type such that the 0.250 and 0.600 kilocycle reference signals are amplitude modulated upon the carrier wave output of the generator 26a. This of course necessitates the use of an amplitude modulation receiver 30 in the receiving unit 13A to reproduce the reference signals radiated by the transmitter 26. These signals are separated from each other and from the carrier heterodyne signals strictly on a frequency selection basis. If still more positive signal separation is desired, phase modulation of the reference signals on the carrier wave radiated by the transmitter 26 may be relied upon. To this end, the modulator section of the unit 26b may be of the type for phase modulating the carrier wave output of the generator 26, and the receiver 30 of the receiving unit 13A may be of the phase modulation type. With this arrangement, the 25 and 60 cycle signals developed at the output terminals of the frequency divider 29 are radiated to the receiver 30 as phase modulation components of the carrier wave transmitted by the transmitter 26. In this receiver, the heterodyne or difference frequency signals resulting from heterodyning of the three received carriers in the radio frequency section of the receiver are rejected at the phase detector stage of the receiver. The 25 and 60 cycle phase modulation components are, however, reproduced by this detector and delivered to the frequency multiplier 39.

The modified system illustrated in Fig. 3 of the drawings is identical with that shown in Fig. 2 of the drawings except that phase modulation of the carrier radiated by the transmitter 26 is alone relied upon to obtain selective detection of the reference signals at any receiving unit. This is accomplished by employing a phase modulator and power amplifier stage 26c in the transmitter 26 and by feeding the output signals from the wave trap 28 directly to the phase modulator 26c for for phase modulation upon the carrier wave output of the generator 26a. Since signal separation on a frequency basis is not relied upon in the Fig. 3 system, it will be understood that no frequency divider is required in the signal transmission channel connecting the output terminals of the receiver 27 with the modulator input terminals of the modulator 26c. In the receiving unit 13A, a phase modulation receiver 40 capable of accepting the carrier wave radiated by the transmitter 26 and reproducing the phase modulation components thereof is employed, which is connected to deliver the reproduced signal voltages directly to the input terminals of the band pass filters 37 and 38. It will be understood that since frequency division is not employed in modulating the reference signals upon the carrier wave output of the transmitter 26, frequency multiplication between the output terminals of the receiver 40 and the two filters 37 and 38 is not required.

As indicated above, the mode of operation of the Fig. 3 system is identical with that of the Fig. 2 system except for the manner in which the reference signals are transmitted by the transmitter 26 and reproduced in the receiving unit 13A. In considering this specific operation, it will be understood that two of the three heterodyne or difference frequency signals resulting from heterodyning of the three carrier waves radiated by the transmitters 10, 26 and 12 in the radio frequency section of the receiver 27, are passed by the wave trap 28 for phase modulation upon the carrier wave output of the transmitter 26. Specifically, the 0.250 and 0.600 kilocycle heterodyne or difference frequency signals are passed by the wave trap 28 and phase modulated upon the carrier wave output of the transmitter 26, whereas the 0.850 kilocycle difference frequency signal is rejected by this trap. In the receiving unit 13A, the phase detector of the phase modulation receiver 40 rejects the heterodyne or difference frequency signals, which result from heterodyning of the three carrier waves in the radio frequency section of this receiver and are manifested as amplitude modulation components of the signal voltage delivered to the detector of the receiver. The 0.250 and 0.600 kilocycle phase modulation components, on the other hand, are reproduced by this receiver and respectively passed by the filters 37 and 38 for application to the respective right sets of input terminals of the phase angle meters 35 and 36. Aside from the difference just referred to, the receiving unit 13A of the Fig. 3 system functions in the exact manner described above with reference to the system shown in Fig. 2 of the drawings to produce the desired phase angle indications from which the position of the receiving unit 13A relative to the transmitters 10 and 12 may be determined.

From the above explanation, it will be understood that the present invention affords a satisfactory solution to the problem of minimizing the number of frequency channels required to form a complete radio position determining system. Thus when the Fig. 1 system is used, only two ten kilocycle channels are required for operation of the system. On the other hand, when either the system of Fig. 2 or that of Fig. 3 is used, only a single ten kilocycle channel is required for system operation. Not only do the described system arrangements satisfactorily obviate the problem of minimizing the channel requirements, but in addition, each minimizes the amount of equipment required to form a complete system. Further, the components making up each transmitter and each receiving unit are simple in the extreme, such that they require little maintenance and may easily be operated by non-skilled personnel. Moreover, the described systems have the advantage that standard and well known components may be employed throughout as regards both the transmitting and receiving equipment.

While different embodiments of the invention have been described, it will be understood that various modifications may be made therein which are within the true spirit and scope of the invention as defined in the appended claims.

I claim:

1. In a position determining system, three spaced transmitters for radiating continuous waves of different frequencies, means in part responsive to the radiated wave from one of said transmitters for developing a first signal representative of the difference frequency between the waves radiated by said one transmitter and a second of said transmitters and in part responsive to the wave radiated from the third of said transmitters for producing a second signal representative of the difference frequency between the waves radiated by said second and third transmitters, and means for modulating said signals upon a common carrier wave for space radiation.

2. In a position determining system, three spaced transmitters for radiating continuous waves of different frequencies, means for heterodyning the waves radiated from a first and second of said transmitters to develop a first signal having a frequency equal to the difference frequency between the waves radiated by said first and second transmitters and for heterodyning the waves radiated from the second and third of said transmitters to develop a second signal having a frequency equal to the difference frequency between the waves radiated by said second and third transmitters, and means for modulating said first and second signals upon a common carrier wave for space radiation.

3. In a position determining system, three spaced transmitters for radiating continuous waves of different frequencies, means for heterodyning the waves radiated by a first and second of said transmitters to develop a first signal having a frequency equal to the difference frequency between the waves radiated by said first and second transmitters and for heterodyning the waves radiated by the second and third of said transmitters to develop a second signal having a frequency equal to the difference frequency between the waves radiated by said second and third transmitters, frequency dividing means for reducing said first and second signals to signals having frequencies distinguishably lower than said difference frequencies, and means for modulating said signals of distinguishably lower frequencies upon a common carrier wave for space radiation.

4. In a position determining system, three spaced transmitters for radiating continuous waves of different frequencies, the difference frequency between the waves radiated by a first and second of said transmitters being different from and non-harmonically related to the difference frequency between the waves radiated by the second and third of said transmitters, means for heterodyning the waves radiated by said first and second transmitters to develop a first signal having a frequency equal to the difference frequency between the waves radiated by said first and second transmitters and for heterodyning the waves radiated by said second and third transmitters to produce a second signal having a frequency equal to the difference frequency between the waves radiated by said second and third transmitters, frequency dividing means for reducing said first and second signals to signals of lower frequencies, and means for modulating said signals of lower frequencies upon a common carrier wave for space radiation.

5. In a position determining system, three spaced transmitters for radiating continuous waves of different frequencies, means in part responsive to the wave radiated from one of said transmitters for developing a first signal representative of the difference frequency between the waves radiated by said one transmitter and a second of said transmitters and in part responsive to the wave radiated from the third of said transmitters for producing a second signal representative of the difference frequency between the wave radiated by said second and third transmitters, and means for modulating said signals upon the wave radiated by one of said transmitters.

6. In a position determining system, three spaced transmitters for radiating continuous waves of different frequencies, means for heterodyning the waves radiated from a first and second of said transmitters to develop a first signal having a frequency equal to the difference frequency between the waves radiated by said first and second transmitters and for heterodyning the waves radiated from the second and third of said transmitters to develop a second signal having a frequency equal to the difference frequency between the waves radiated by said second and third transmitters, and means for modulating said signals upon the wave radiated by one of said transmitters.

7. In a position determining system, three spaced transmitters for radiating continuous waves of different frequencies, means for heterodyning the waves radiated by a first and second of said transmitters to develop a first signal having a frequency equal to the difference frequency between the waves radiated by said first and second transmitters and for heterodyning the waves radiated by the second and third of said transmitters to develop a second signal having a frequency equal to the difference frequency between the waves radiated by said second and third transmitters, frequency dividing means for reducing said first and second signals to signals having frequencies distinguishably lower than said difference frequencies, and means for modulating said signals of distinguishably lower frequencies upon the wave radiated by one of said transmitters.

8. In a position determining system, three spaced transmitters for radiating continuous waves of different frequencies, the difference frequency between the waves radiated by a first and second of said transmitters being different from and non-harmonically related to the difference frequency between the waves radiated by the second and third of said transmitters, means for heterodyning the waves radiated by said first and second transmitters to develop a first signal having a frequency equal to the difference frequency between the waves radiated by said first and second transmitters and for heterodyning the waves radiated by said second and third transmitters to produce a second signal having a frequency equal to the difference frequency between the waves radiated by said second and third transmitters, frequency dividing means for reducing said first and second signals to signals of lower frequencies, and means for modulating said signals of lower frequencies upon the wave radiated by one of said transmitters.

9. In a position determining system, three spaced transmitters for radiating continuous waves of different frequencies, the difference frequency between the waves radiated by a first and second of said transmitters being different from and non-harmonically related to the difference frequency between the waves radiated by the second and third of said transmitters, means located in proximity to said second transmitter for heterodyning wave energy derived from said first and second transmitters to develop a first signal having a frequency equal to the difference frequency between the waves radiated by said first and second transmitters and for heterodyning wave energy derived from said second and third transmitters to develop a second signal having a frequency equal to the difference frequency between the waves radiated by said second and third transmitters, frequency converting means for changing said first and second signals to signals having frequencies distinguishably different from said difference frequencies, and means for phase modulating said signals of distinguishably different frequencies upon the wave radiated by said second transmitter.

10. In a position determining system, three spaced transmitters for radiating continuous waves of different frequencies, means in part responsive to the radiated wave from one of said transmitters for producing a signal representative of the difference frequency between the waves radiated by said one transmitter and a second of said transmitters and in part responsive to the radiated wave from the third of said transmitters for producing another signal representative of the difference frequency between the waves radiated by said second and third transmitters, and means for modulating said signals upon the continuous wave output of said second transmitter.

11. In a position determining system, three spaced transmitters for radiating continuous waves of different frequencies, means in part responsive to the radiated wave from one of said transmitters for producing a signal representative of the difference frequency between the waves radiated by said one transmitter and a second of said transmitters and in part responsive to the radiated wave from the third of said transmitters for producing another signal representative of the difference frequency between the waves radiated by said second and third transmitters, and means for phase modulating said signals upon the continuous wave output of said second transmitter.

12. In a position determining system, three spaced transmitters for radiating continuous waves of different frequencies, means in part responsive to the radiated wave from one of said transmitters for developing a first signal representative of the difference frequency between the waves radiated by said one transmitter and a second of said transmitters and in part responsive to the wave radiated from the third of said transmitters for producing a second signal representative of the difference frequency between the waves radiated by said second and third transmitters, a link transmitter for radiating a carrier wave at a frequency distinguishable from the different frequencies of said continuous waves, and means for modulating both of said signals upon the carrier wave of said link transmitter for space radiation.

13. In a position determining system, three spaced transmitters for radiating continuous waves of different frequencies, means for heterodyning said waves to produce three signals having frequencies respectively equal to the difference frequencies between different pairs of said waves, means for modulating two of said signals upon a common carrier wave for space radiation, and means for preventing the third of said signals from being modulated upon said common carrier wave.

14. In a position determining system, three spaced transmitters for radiating continuous waves of different frequencies, means for heterodyning said waves to produce distinguishable signals having frequencies respectively equal to the difference frequencies between different pairs of said waves, a link transmitter for radiating a carrier wave at a frequency distinguishable from the different frequencies of said continuous waves, and means for modulating at least two of said signals upon said carrier wave for space radiation.

15. In a position determining system, three spaced transmitters for radiating continuous waves of different frequencies, means responsive to said radiated waves for producing distinguishable signals having frequencies respectively representative of the difference frequencies between different pairs of said waves, and means for modulating at least two of said signals upon a common carrier for space radiation.

16. In a position determining system, three spaced transmitters for radiating continuous waves of different frequencies, means responsive to said radiated waves for heterodyning said waves to produce distinguishable signals having frequencies respectively equal to the difference frequencies between different pairs of said waves, frequency converting means for converting at least two of said signals to signals having frequencies distinguishably lower than said difference frequencies, and means for phase modulating said signals of distinguishably lower frequencies upon the wave radiated by one of said transmitters.

17. In a position determining system, three spaced transmitters for radiating continuous waves of different frequencies, a receiver for heterodyning said waves to produce three signals having frequencies respectively equal to the difference frequencies between different pairs of said waves, means including a signal transmission path extending from said receiver to one of said transmitters for modulating two of said signals upon the carrier wave radiated by said one transmitter, and a wave trap included in said signal transmission path to prevent the third of said signals from being modulated upon the carrier wave radiated by said one transmitter.

18. In a position determining system, three spaced transmitters for radiating continuous waves of different frequencies, a receiver for heterodyning said waves to produce three signals having frequencies respectively equal to the difference frequencies between different pairs of said waves, means including a signal transmission path extending from said receiver to one of said transmitters for phase modulating two of said signals upon the carrier wave radiated by said one transmitter, and a wave trap included in said signal transmission path to prevent the third of said signals from being phase modulated upon the carrier wave radiated by said one transmitter.

19. In a position determining system, three spaced transmitters for radiating continuous waves of different frequencies, a receiver for heterodyning said waves to produce three signals having frequencies respectively equal to the difference frequencies between different pairs of said waves, a wave trap coupled to said receiver for rejecting one of said signals and passing the other two of said signals, means for converting said two signals to signals of distinguishably lower frequencies, and means for modulating said signal of distinguishably lower frequency upon the carrier wave radiated by one of said transmitters.

20. A wave signal transmission system, comprising three spaced transmitters for radiating signals of different frequencies, means for receiving and heterodyning said signals to produce at least two reference signals having frequencies respectively representative of beat frequencies between different pairs of signals radiated by said transmitters, and means for modulating at least two of said reference signals upon a common carrier for space radiation.

21. A wave signal transmission system, comprising three spaced transmitters for radiating signals of different frequencies, means for receiving and heterodyning said signals to produce at least two reference signals having frequencies respectively representative of beat frequencies between different pairs of the signals radiated by said transmitters, and means for modulating at least two of said reference signals upon the signal radiated by one of said transmitters.

22. A wave signal transmission system, comprising three spaced transmitters for radiating signals of different frequencies, means for receiving and heterodyning said signals to produce at least two reference signals having frequencies respectively representative of beat frequencies between different pairs of the signals radiated by said transmitters, a link transmitter for radiating a carrier wave at a frequency distinguishably different from the different frequencies of the signals radiated by said three transmitters, and means for modulating at least two of said reference signals upon the carrier wave radiated by said link transmitter.

23. A wave signal transmission system, comprising a plurality of transmitters for radiating signals of different frequencies, heterodyning means responsive to signals derived from said transmitters for heterodyning the derived signals in pairs to produce beat frequency signals having frequencies respectively representative of beat frequencies between different pairs of signals radiated by said transmitters, means controlled by said beat frequency signals for producing at least two reference signals, and means for modulating at least two of said reference signals upon a common carrier for space radiation.

24. A wave signal transmission system, comprising a plurality of transmitters for radiating signals of different frequencies, heterodyning means responsive to signals derived from said transmitters for heterodyning the derived signals in pairs to produce beat frequency signals having frequencies respectively representative of beat frequencies between different pairs of signals radiated by said transmitters, means excited by said beat frequency signals for producing at least two reference signals having different frequencies, and means for modulating at least two of said reference signals upon a common carrier for space radiation.

25. A wave signal transmission system, comprising a plurality of transmitters for radiating signals of different frequencies and at least certain of which are spaced apart, heterodyning means responsive to signals derived from different spaced pairs of said transmitters for heterodyning the derived signals in pairs to produce beat frequency signals having frequencies respectively representative of beat frequencies between different pairs of signals radiated by said transmitters, means controlled by said beat frequency signals for producing at least two reference signals, and means for modulating at least two of said reference signals upon the signal radiated by one of said transmitters.

26. A wave signal transmission system, comprising a plurality of transmitters for radiating signals of different frequencies and at least certain of which are spaced apart, heterodyning means responsive to signals derived from different spaced pairs of said transmitters for heterodyning the derived signals in pairs to produce beat frequency signals having frequencies respectively representative of beat frequencies between different pairs of signals radiated by said transmitters, means excited by said beat frequency signals for producing at least two reference signals having different frequencies and means for modulating at least two of said reference signals upon the signal radiated by one of said transmitters.

JAMES E. HAWKINS.

REFERENCES CITED

The following references are of record in the file of this patent:

UNITED STATES PATENTS

| Number | Name | Date |
| --- | --- | --- |
| 2,144,203 | Shanklin | Jan. 17, 1939 |
| 2,148,267 | Honore | Feb. 21, 1939 |
| 2,408,773 | Goodall | Oct. 8, 1946 |
| 2,417,807 | Brunner | Mar. 25, 1947 |
| 2,423,305 | Fletcher | July 1, 1947 |